(12) United States Patent
Okada et al.

(10) Patent No.: US 12,234,859 B2
(45) Date of Patent: Feb. 25, 2025

(54) POSITION ADJUSTMENT MECHANISM

(71) Applicant: HI-LEX CORPORATION, Hyogo (JP)

(72) Inventors: Tomoyoshi Okada, Hyogo (JP); Tatsuhiko Hasegawa, Hyogo (JP); Atsushi Nishimura, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 545 days.

(21) Appl. No.: 17/626,133

(22) PCT Filed: Aug. 21, 2020

(86) PCT No.: PCT/JP2020/031544
§ 371 (c)(1),
(2) Date: Jan. 11, 2022

(87) PCT Pub. No.: WO2021/039609
PCT Pub. Date: Mar. 4, 2021

(65) Prior Publication Data
US 2022/0260108 A1    Aug. 18, 2022

(30) Foreign Application Priority Data
Aug. 23, 2019 (JP) .................................. 2019-153134

(51) Int. Cl.
*F16C 1/22* (2006.01)
(52) U.S. Cl.
CPC ..................... *F16C 1/22* (2013.01)
(58) Field of Classification Search
None
See application file for complete search history.

(56) References Cited

U.S. PATENT DOCUMENTS 5,207,116 A * 5/1993 Sultze .................... F16C 1/223
403/379.2
5,605,074 A   2/1997 Hall et al.
(Continued)

FOREIGN PATENT DOCUMENTS

JP    H09177754 A    7/1997
JP    2003-097537 A  4/2003

OTHER PUBLICATIONS

International Search Report and Written Opinion from PCT/JP2020/031544 dated Oct. 20, 2020.

*Primary Examiner* — Vicky A. Johnson
(74) *Attorney, Agent, or Firm* — Calfee, Halter & Griswold LLP

(57) ABSTRACT

Provided is a position adjustment mechanism including: a case; a moving member including a first engaging part and a second engaging part; a lock member provided in the case so as to be movable between a lock position for regulating movement of the moving member in a first direction with respect to the case and a separate position for allowing relative movement of the moving member with respect to the case; and a long member. The lock member includes: a first engaged part engaging with the first engaging part in the first direction; and a second engaged part engaging with the second engaging part in the first direction. When the lock member is at the separate position, the lock member regulates separation of the moving member from the case by engagement of the first engaging part with the first engaged part in the first direction.

5 Claims, 7 Drawing Sheets

(56) References Cited

U.S. PATENT DOCUMENTS 5,653,147 A     8/1997   Reasoner
5,653,148 A     8/1997   Reasoner
5,682,797 A  * 11/1997   Kelley ................... F16C 1/26
                                                                                                                                                    403/294

* cited by examiner

POSITION ADJUSTMENT MECHANISM

RELATED APPLICATIONS

The present application is a 35 U.S.C. 371 U.S. national stage application entry of PCT International Application No. PCT/JP2020/031544, filed on Aug. 21, 2020 which claims the benefit of Japanese Patent Application No. 2019-153134, filed Aug. 23, 2019, the entire disclosures of which are incorporated herein by reference.

TECHNICAL FIELD

The present invention relates to a position adjustment mechanism.

BACKGROUND ART

When a control cable is routed in an object to be attached (hereinafter, referred to as "attachment object"), such as a vehicle body, there is a case where an apparatus for adjusting the length of the control cable in the axial direction is provided (for example, see Patent Literature (hereinafter, referred to as "PTL") 1). The conduit shortening apparatus of PTL 1 includes: a male member; a female member into which the male member is telescopically inserted in the axial direction; and a locking member attached to the female member such that the female member does not move in the axial direction and can move perpendicularly to the axial direction. The conduit shortening apparatus of PTL 1 includes a row of teeth extending in the axial direction on a side surface of the male member, and the locking member includes teeth that mesh with the row of teeth. In a case where the length of the conduit in the conduit shortening apparatus is adjusted, the male member is moved in the axial direction with respect to the female member, and then the locking member is pushed in a direction perpendicular to the axial direction to cause the teeth of the locking member to engage with the row of teeth of the male member. Thus, movement of the male member in the axial direction with respect to the female member is regulated, and the length of the conduit is adjusted.

The locking member in the conduit shortening apparatus of PTL 1 is formed in a U-shape, and includes claw-like hooks at leading ends of a pair of arms of the locking member. Before the locking member is pushed toward the male member, the hooks of the locking member engage with detent recesses provided in the female member so that the locking member is prevented from coming off. After the locking member is pushed, on the other hand, the hooks of the locking member engage with catches of the female member so that the locking state between the locking member and the female member is maintained.

CITATION LIST

Patent Literature

PTL 1
Japanese Patent Application Laid-Open No. H09-177754

SUMMARY OF INVENTION

Technical Problem

However, in the case of the structure of PTL 1, for example, when a force is applied in a direction in which the locking member is pushed, such as in a case where the locking member is transported together with the male member and the female member, the locking member is pushed in a direction perpendicular to the axis. Accordingly, during transportation of the apparatus, the locking member is pushed and engages with the catches of the female member. Accordingly, in a case where adjustment of relative positions of the male member and the female member with respect to each other for adjusting the length of the conduit when the conduit is assembled to an attachment object such as a vehicle body is performed, it is necessary to once detach the locking member from the catches of the female member and to return the pushed locking member to the original state. That is, such a structure makes the operation for performing position adjustment complicated.

Solution to Problem

In view of such a problem, an object of the present invention is to provide a position adjustment mechanism used for a long member such as a control cable and allowing position adjustment by a simple operation.

A position adjustment mechanism of the present invention includes: a case extending in a first direction; a moving member movable in the first direction with respect to the case; a lock member attached to the case so as to be movable in a second direction with respect to the case, where the second direction is a direction perpendicular to the first direction; and a long member connected to the case and/or the moving member. The moving member includes: a first engaging part that engages with the lock member in the first direction; and a second engaging part that engages with the lock member in the first direction by movement of the lock member in the second direction. The lock member includes: a first engaged part that engages with the first engaging part in the first direction; and a second engaged part that engages with the second engaging part in the first direction by the movement of the lock member in the second direction. The moving member and the case are assembled such that the moving member separates from the case by moving in a separation direction of the first direction with respect to the case. The lock member is provided in the case so as to be movable between a lock position and a separate position, where the lock position is a position at which the second engaged part engages with the second engaging part in the second direction to regulate movement of the moving member in the first direction with respect to the case, and the separate position is a position at which the second engaged part separates from the second engaging part in the second direction to allow relative movement of the moving member with respect to the case. When the lock member is at the separate position, the lock member regulates separation of the moving member from the case by engagement of the first engaging part with the first engaged part in the first direction. The moving member allows a relative position of the moving member with respect to the case to be adjusted by separation of the first engaging part from the first engaged part of the lock member and the relative movement of the moving member with respect to the case.

Advantageous Effects of Invention

According to the position adjustment mechanism of the present invention, it is possible to adjust the position of a long member by a simple operation.

DESCRIPTION OF EMBODIMENTS

Hereinafter, a position adjustment mechanism configured to perform long member position adjustment in an embodiment of the present invention will be described with reference to the accompanying drawings. Note that, the embodiment described below is merely an example, and the position adjustment mechanism of the present invention is not limited to the following embodiment.

Figure 1:
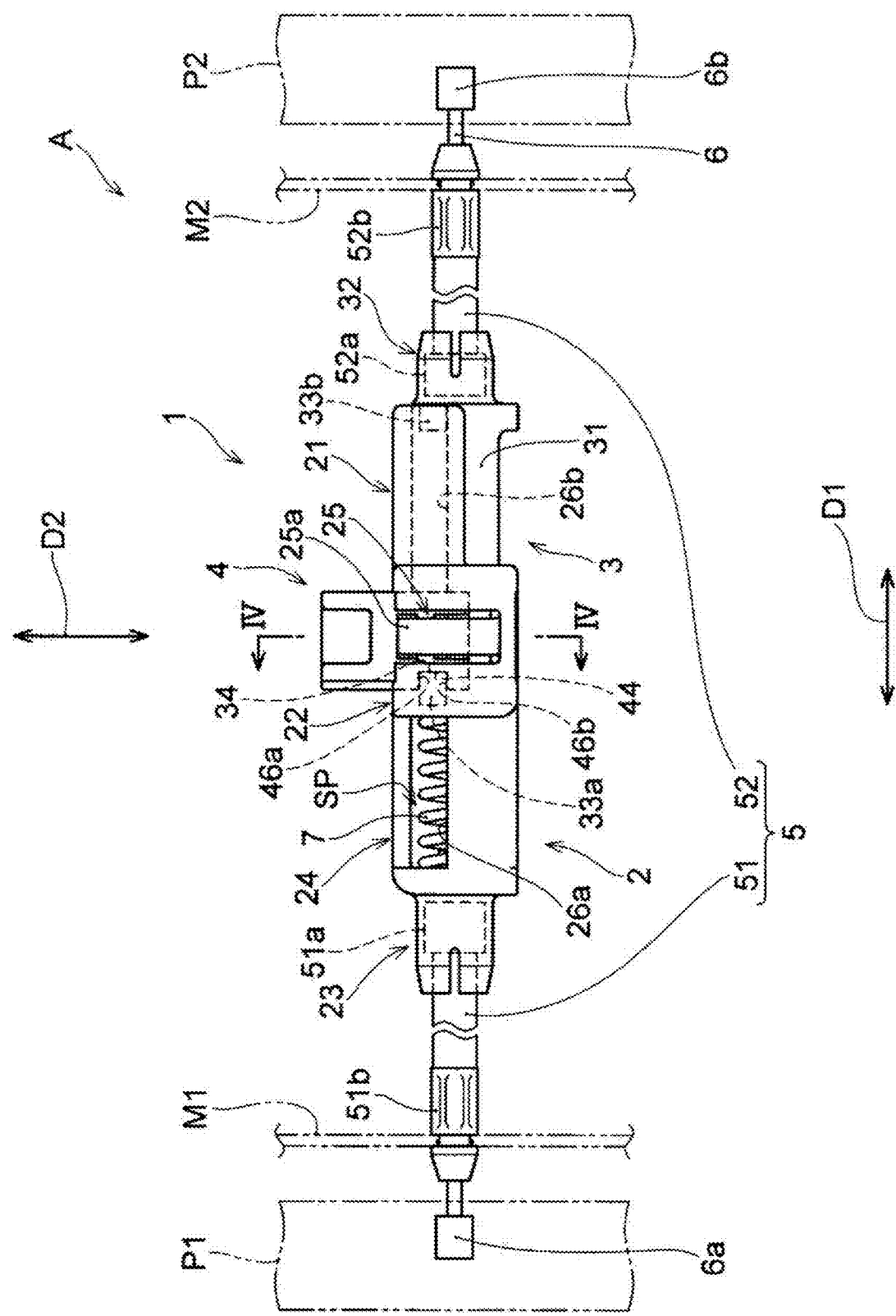
FIG. 1 is a side view of a position adjustment mechanism of an embodiment of the present invention.
Figure 2:
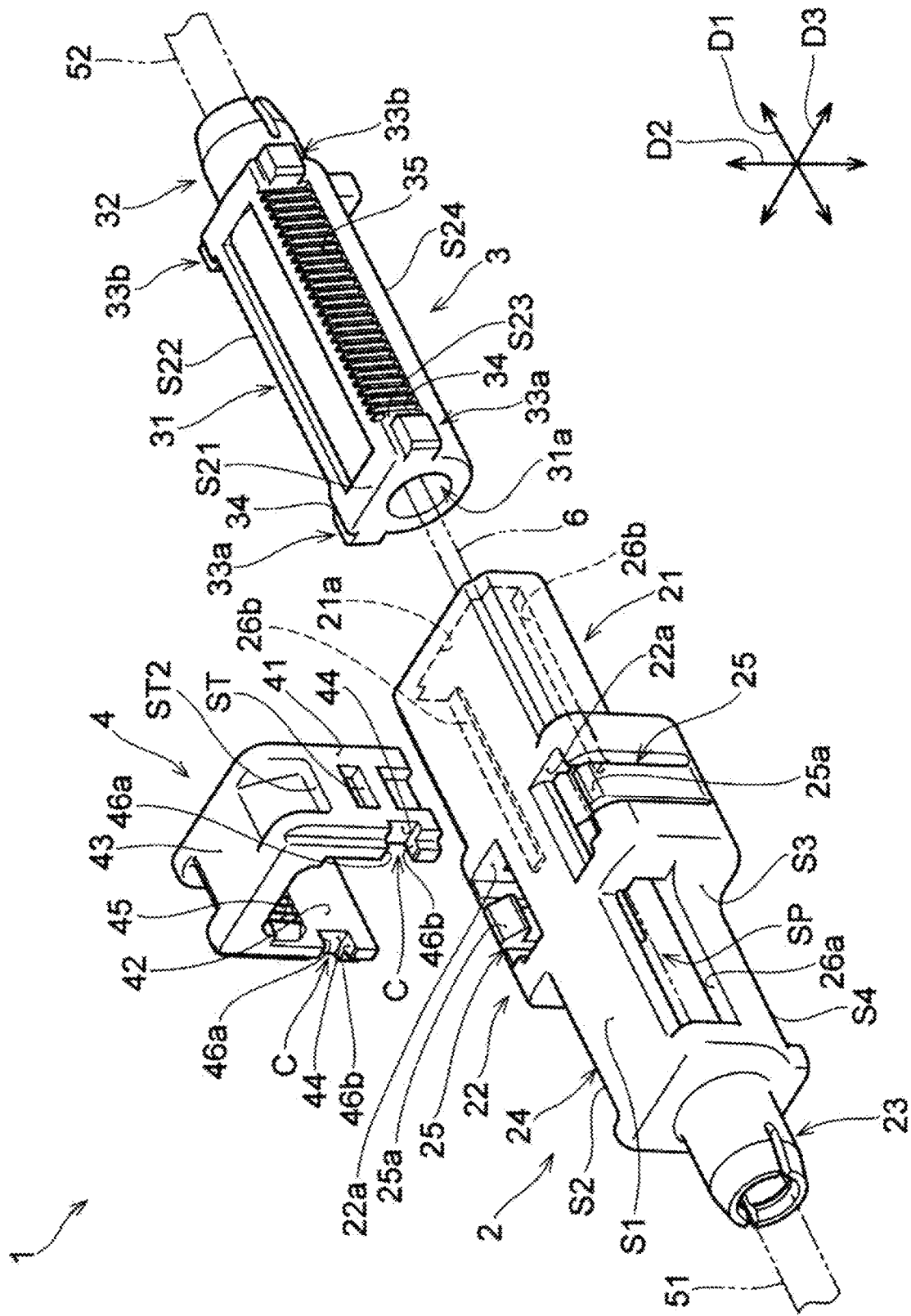
FIG. 2 is an exploded perspective view of the position adjustment mechanism of FIG. 1.

As illustrated in FIGS. 1 and 2, position adjustment mechanism 1 configured to perform long member position adjustment in the present embodiment includes: case 2 extending in first direction D1; moving member 3 movable in first direction D1 with respect to case 2; lock member 4 attached to case 2 so as to be movable in second direction D2 with respect to case 2, where second direction D2 is a direction perpendicular to first direction D1; and long member 5 connected to case 2 and/or moving member 3. Note that, in the present specification, a direction perpendicular to both first direction D1 and second direction D2 is referred to as "third direction D3" (see FIG. 2). Further, in the present specification, one direction of first direction D1 is referred to as "pushing direction", and the other direction of first direction D1 is referred to as "separation direction". The pushing direction is a direction of first direction D1, in which the total length of moving member 3 and case 2 in a state in which moving member 3 and case 2 are assembled becomes shorter in first direction D1. Further, the separation direction is a direction of first direction D1, in which the total length of moving member 3 and case 2 in a state in which moving member 3 and case 2 are assembled becomes longer, or is a direction in which moving member 3 is detached from case 2.

As described later, position adjustment mechanism 1 relatively moves moving member 3 in first direction D1 with respect to case 2 to adjust a relative position of moving member 3 with respect to case 2 in first direction D1, thereby adjusting the position of long member 5. The object to which position adjustment mechanism 1 is applied is not particularly limited as long as position adjustment mechanism 1 is capable of adjusting the relative position of moving member 3 with respect to case 2 in first direction D1. In the present embodiment, position adjustment mechanism 1 is provided in long member-operating apparatus ("control cable-operating apparatus" in the present embodiment) A that operates long member 5. In the present embodiment, long member-operating apparatus A including position adjustment mechanism 1 can be configured as, for example, a control cable-operating apparatus that is applied to a lock mechanism of an opening and closing body such as a hood, a trunk, and a fuel lid of a vehicle, a sheet lock mechanism that locks a tilted state of a seat, or the like.

Long member 5 is a long member connected to case 2 and/or moving member 3. The type of long member 5 is not particularly limited. In the present embodiment, long member 5 is an outer casing of a control cable, but the long member may be an inner cable of a control cable, may be another wire, or may be a bar-like member such as a rod, for example.

One end of long member 5 is connected to case 2 and/or moving member 3, the other end of long member 5 is connected to, for example, a predetermined attachment part, and long member 5 is provided along a predetermined path. Note that, the number of long member 5 connected to case 2 and/or moving member 3 may be one, two, or three or more. In the present embodiment, long member 5 is connected to both case 2 and moving member 3 as illustrated in FIG. 1, but may be connected to one of case 2 and moving member 3. Further, two or more long members 5 may be connected in parallel to one end part of case 2 and/or moving member 3.

In the present embodiment, long member 5 includes first outer casing 51 connected to case 2, and second outer casing 52 connected to moving member 3 as illustrated in FIG. 1. One end 51a of first outer casing 51 is connected to case 2, and other end 51b of first outer casing 51 is attached to first attachment part M1 of a vehicle body or the like. One end 52a of second outer casing 52 is connected to moving member 3, and other end 52b of second outer casing 52 is attached to second attachment part M2 of the vehicle body or the like. First outer casing 51 and second outer casing 52 are routed on a predetermined routing path by attachment of the end parts (other end 51b and other end 52b) thereof to an attachment object such as the vehicle body at positions, such as first attachment part M1 and second attachment part M2, that are separate from each other with a predetermined distance.

In the present embodiment, one inner cable 6 is inserted through first outer casing 51 and second outer casing 52. As illustrated in FIG. 1, one end 6a of inner cable 6 is directly or indirectly connected to operating section P1, and other end 6b of inner cable 6 is directly or indirectly connected to operated section P2. In the present embodiment, an operation force applied to operating section P1 is transmitted from one end 6a side of inner cable 6 to other end 6b side thereof to cause operated section P2 to be operated. Note that, operating section P1 and operated section P2 may be reversed. Further, although one inner cable 6 is inserted through first outer casing 51 and second outer casing 52 in the present embodiment, different inner cables may be inserted through first outer casing 51 and second outer casing 52, respectively. Further, long member 5 may also include a rod having rigidity on one end 6a side of inner cable 6 or on other end 6b side thereof. As long as a long member having a predetermined length between a one end side and the other end side is used, long member 5 may form a connection structure in which a rod extends from one end part of case 2 and/or moving member 3 and is connected to operating section P1 or operated section P2.

Case 2 is configured such that moving member 3 is movable in first direction D1. Further, lock member 4 is attached to case 2 so as to be movable in second direction D2. The shape and structure of case 2 are not particularly limited as long as moving member 3 can be attached to case 2 so as to be movable in first direction D1 and lock member 4 can be attached to case 2 so as to be movable in second direction D2. In the present embodiment, case 2 includes space SP capable of accommodating moving member 3 in first direction D1 as illustrated in FIG. 2. In the present embodiment, case 2 includes first side surface S1, second side surface S2, third side surface, and fourth side surface S4 as illustrated in FIG. 2. First side surface S1 extends in first direction D1 and third direction D3. Second side surface S2 extends substantially perpendicularly to first side surface S1, and extends in first direction D1 and second direction D2. Third side surface S3 extends substantially parallel to second side surface S2. Fourth side surface S4 extends substantially parallel to first side surface S1. The material of case 2 is not particularly limited. Case 2 is formed of a material, such as a synthetic resin material, which has rigidity that allows engagement with lock member 4.

Figure 3:
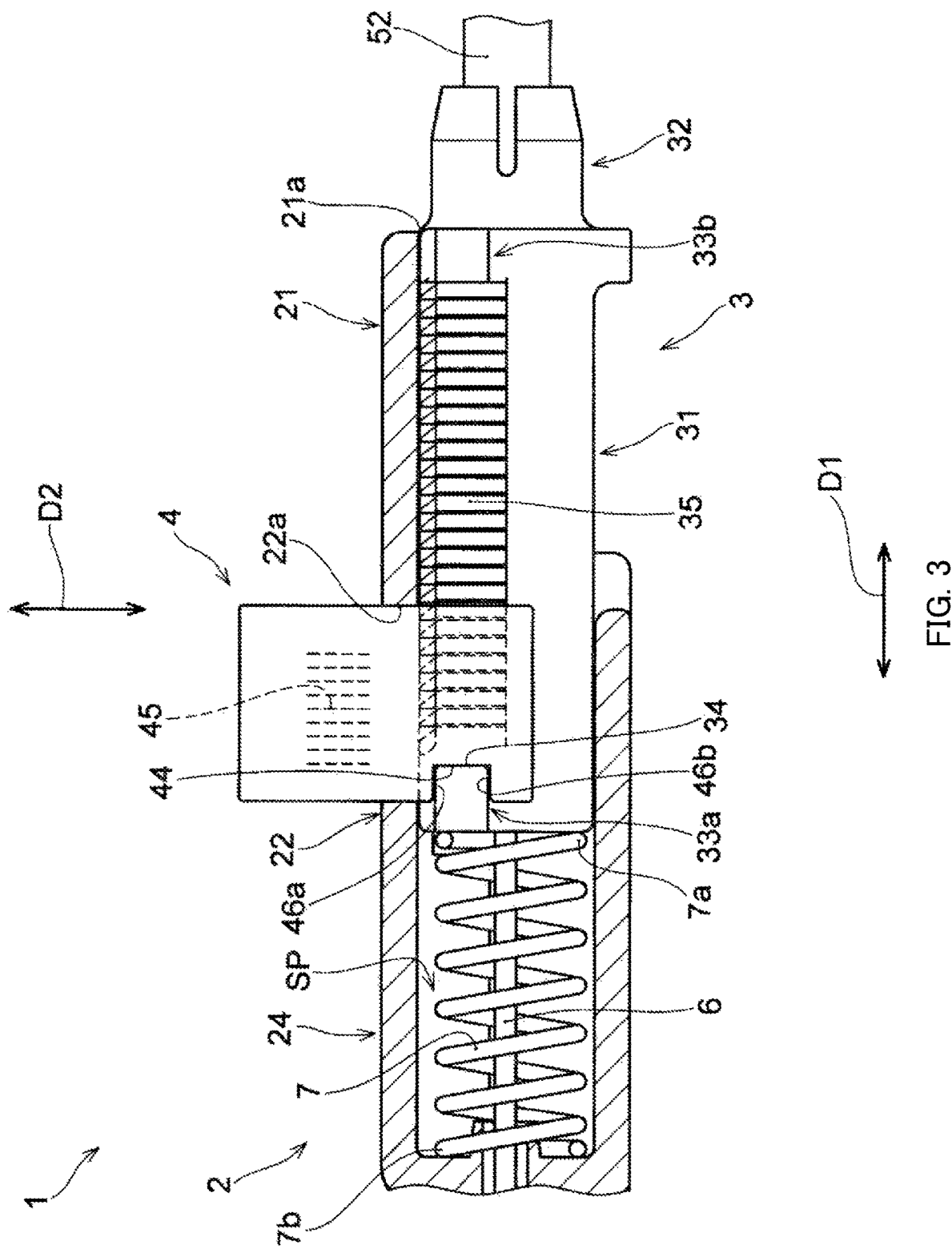
FIG. 3 is a partial cross-sectional view of a case of the position adjustment mechanism of FIG. 1 cut along a first direction and a second direction.

In the present embodiment, as illustrated in FIGS. 1 and 2, case 2 includes moving member attachment part 21 and lock member attachment part 22. Moving member attachment part 21 allows attachment of moving member 3 to case 2 such that moving member 3 is movable along first direction D1. Lock member attachment part 22 allows attachment of lock member 4 to case 2 such that lock member 4 is movable along second direction D2. Further, in the present embodiment, case 2 includes long member attachment part 23 to which one end of long member 5 is attached. Case 2 includes, between lock member attachment part 22 and long member attachment part 23 in first direction D1, body part 24 extending in first direction D1. Further, case 2 includes space SP extending along first direction D1 such that moving member 3 is movable along first direction D1. Case 2 and moving member 3 are configured to be relatively movable with respect to each other. In the present embodiment, position adjustment mechanism 1 includes elastic member 7 to be described later (illustration of elastic member 7 is omitted in FIG. 2) in space SP of case 2 as illustrated in FIGS. 1 and 3.

Movement member attachment part 21 is a portion of case 2 to which moving member 3 is attached so as to be movable along first direction D1. In the present embodiment, moving member attachment part 21 is provided at one end of case 2 in first direction D1 (the end part of case 2 on a side of the separation direction of first direction D1) as illustrated in FIGS. 1 and 2. In the present embodiment, moving member attachment part 21 provided at the one end of case 2 includes first opening 21a (see FIG. 2) which communicates with space SP and which opens in first direction D1. In space SP, moving member 3 attached to case 2 by insertion from first opening 21a moves along first direction D1. The shape of moving member attachment part 21 is not particularly limited. In the present embodiment, however, as illustrated in FIG. 2, moving member attachment part 21 has a cross section perpendicular to first direction D1, which is formed in a substantially C-shape, and is provided with two second fitting parts 26b that are arranged separate from each other in third direction D3. Between two second fitting parts 26b, an opening-like gap, which is formed such that moving member 3 is movable in first direction D1, extends along first direction D1. Case 2 is provided with a movement gap, in which protrusions 33a move, between an inner side surface facing in second direction D2 and second fitting parts 26b. This movement gap is provided between first opening 21a and space SP inside case 2 in first direction D1, and second fitting parts 26b guide protrusions 33a in first direction D1. Lock member attachment part 22 is a portion to which lock member 4 is attached so as to be movable along second direction D2. In the present embodiment, lock member attachment part 22 is provided on first side surface S1 of case 2 as illustrated in FIG. 2. Lock member attachment part 22 includes second opening 22a (see FIG. 2) which opens in second direction D2. Lock member 4 is attached to lock member attachment part 22 of case 2 by insertion from second opening 22a such that lock member 4 is movable along second direction D2. In the present embodiment, lock member 4 is attached to case 2 so as to be movable in a direction intersecting the axial direction of long member 5. Lock member attachment part 22 includes two second openings 22a having a substantially rectangular shape such that lock member 4 to be described later is attachable so as to be movable in second direction D2. However, the number and shape of second opening 22a are not particularly limited as long as second opening 22a allows attachment of lock member 4 to case 2 such that lock member 4 is movable in second direction D2. For example, second opening 22a may not be divided into two, but may be one large opening that allows lock member 4 to be attached thereto.

Figure 4:
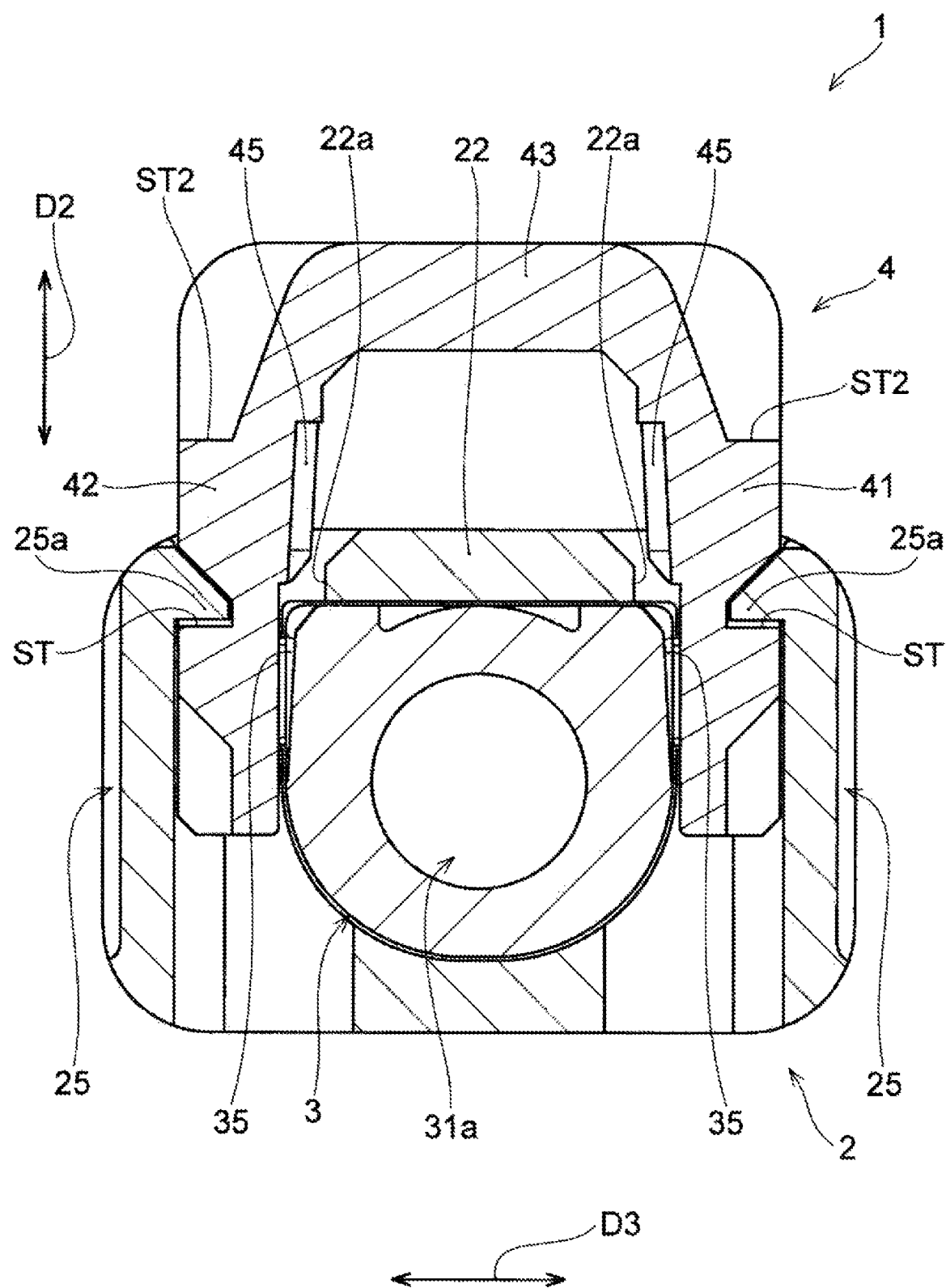
FIG. 4 is a cross-sectional view of FIG. 1 taken along a line IV-IV.
Figure 5:
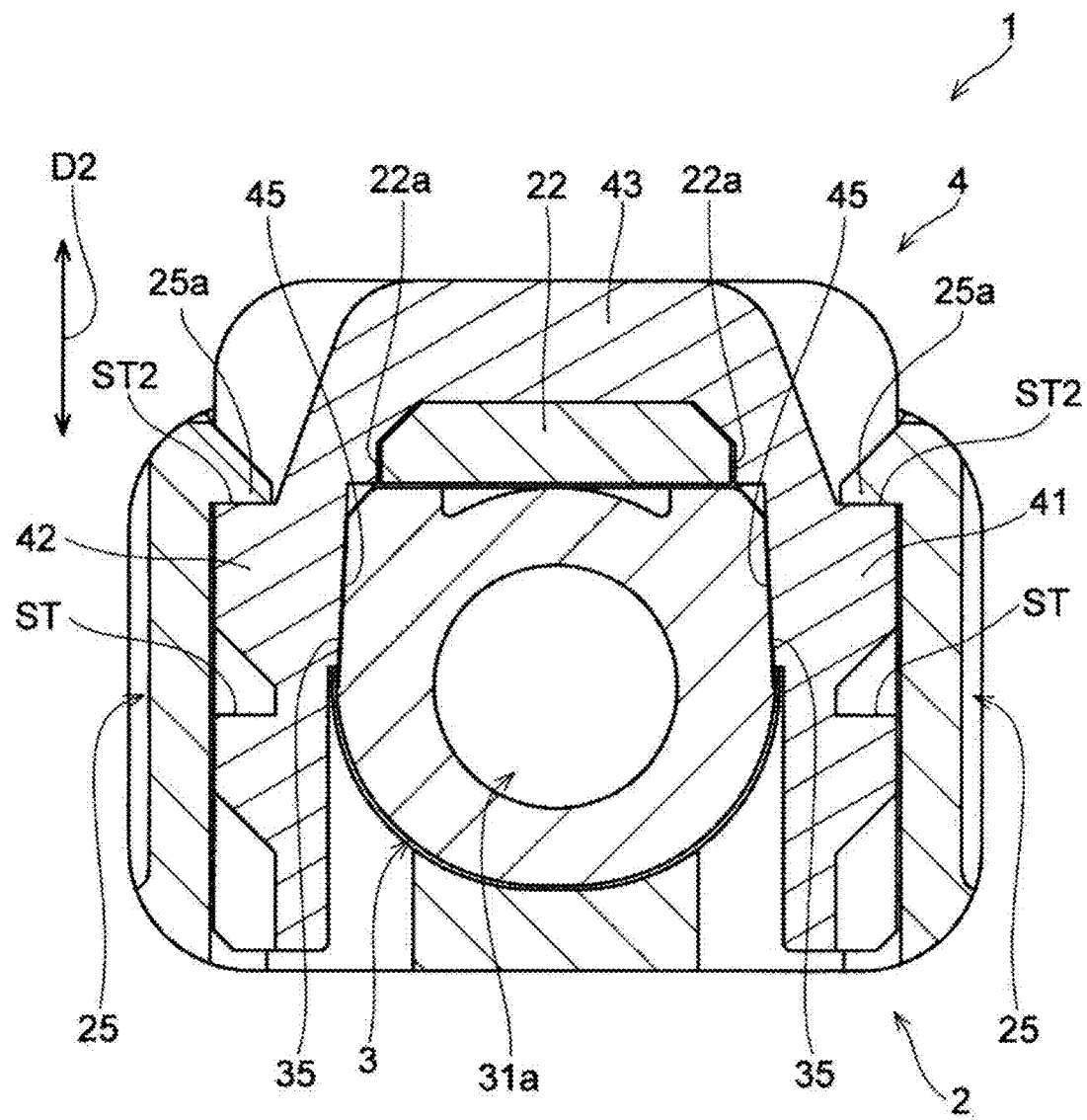
FIG. 5 is a cross-sectional view illustrating a state in which a lock member is moved to a lock position from the state of FIG. 4.

Further, in the present embodiment, as illustrated in FIGS. 2, 4 and 5, case 2 (lock member attachment part 22) includes locking claw 25 that is locked with locking step part ST of lock member 4 to be described later to restrain lock member 4 from coming off from case 2. Locking claw 25 extends substantially perpendicularly to first side surface S1 of case 2, on which second opening 22a is formed, and along second direction D2 (on second side surface S2 and third side surface S3). Leading end 25a of locking claw 25 is configured to be located near an opening edge of second opening 22a. Locking claw 25 includes an engaging part and a support part, and has a function as a leaf spring. The engaging part engages with lock member 4. The support part elastically supports the engaging part. Leading end 25a of locking claw 25 is inclined such that locking claw 25 bends and outwardly extends in third direction D3 when lock member 4 moves in a direction of second direction D2, in which lock member 4 is inserted into case 2. Note that, although two locking claws 25 facing each other in third direction D3 are provided in the present embodiment, the number and placement direction of locking claw 25 are not particularly limited.

Long member attachment part 23 is a portion to which one end of long member 5 is attached. In the present embodiment, one end 51a of first outer casing 51 is attached to long member attachment part 23. In the present embodiment, long member attachment part 23 is provided at the other end of case 2 opposite to the one end thereof, at which moving member attachment part 21 is provided, in first direction D1.

As illustrated in FIGS. 1 and 2, body part 24 is provided in the pushing direction of first direction D1 opposite to the separation direction thereof with respect to lock member attachment part 22. That is, body part 24 is provided on a side opposite to first opening 21a with respect to lock member attachment part 22. In the present embodiment, body part 24 is provided between lock member attachment part 22 and long member attachment part 23 in first direction D1, and has a cross section perpendicular to first direction D1, which is formed in a substantially rectangular shape. Body part 24 includes space SP inside, and elastic member 7 is disposed in space SP. Space SP inside body part 24 is formed to have a size that allows moving member 3 to move in first direction D1.

Further, in the present embodiment, as illustrated in FIGS. 1 and 2, case 2 includes fitting part 26a in which protrusion 33a of moving member 3 to be described later fits so as to be movable in first direction D1. Fitting part 26a functions as a guide section that guides moving member 3 by protrusion 33a of moving member 3 fitting in fitting part 26a such that protrusion 33*a* is stably movable in first direction D1. In the present embodiment, fitting part 26*a* extends along first direction D1 with a length equal to or longer than the movement stroke of moving member 3 in first direction D1. In the present embodiment, fitting part 26*a* includes a wall part that abuts on protrusion 33*a* on both sides in second direction D2 so as to regulate movement of protrusion 33*a* of moving member 3 in second direction D2 within a predetermined range. In the present embodiment, fitting part 26*a* is provided in body part 24 of case 2. Note that, in the present embodiment, second side surface S2 and third side surface S3 of case 2 open such that space SP of case 2 communicates with the outside of case 2 along fitting parts 26*a* as illustrated in FIG. 2. However, case 2 may not include any opening along fitting part 26*a*.

Further, in the present embodiment, case 2 includes second fitting part 26*b* in which second protrusion 33*b* of moving member 3 to be described later fits so as to be movable in first direction D1. Second fitting part 26*b* functions as a guide section that guides moving member 3 by second protrusion 33*b* of moving member 3 fitting in second fitting part 26*b* such that second protrusion 33*b* is stably movable in first direction D1. In the present embodiment, moving member 3 and case 2 are configured to relatively move with respect to each other by sliding of protrusion 33*a* with fitting part 26*a* and sliding of second protrusion 33*b* with second fitting part 26*b*. In this case, when moving member 3 moves, moving member 3 is supported by fitting part 26*a* and second fitting part 26*b* at two position that are separate from each other in first direction D1 with respect to case 2 (see FIG. 1). Thus, the movement of moving member 3 in first direction D1 is further stabilized, and the position of moving member 3 is more smoothly adjusted by position adjustment mechanism 1. Note that, protrusion 33*a* and second protrusion 33*b* slide along with second fitting part 26*b*, and are guided by second fitting part 26*b*. However, moving member 3 can be configured to be guided by sliding with protrusion 33*a* and second fitting part 26*b*.

In the present embodiment, second fitting part 26*b* extends along first direction D1 with a length equal to or longer than the movement stroke of moving member 3 in first direction D1, in which the position of moving member 3 is adjustable. Second fitting part 26*b* includes a wall part that abuts on second protrusion 33*b* on both sides in second direction D2 so as to regulate movement of second protrusion 33*b* of moving member 3 in second direction D2 within a predetermined range. In the present embodiment, second fitting part 26*b* is provided in moving member attachment part 21 of case 2 as illustrated in FIG. 1. Specifically, second fitting part 26*b* is provided inside a wall part that forms moving member attachment part 21. In the present embodiment, in moving member attachment part 21, second fitting part 26*b* is formed by a pair of wall parts (wall parts formed by first side surface S1 and fourth side surface S4 of case 2) facing each other in second direction D2, and wall parts (wall parts formed by second side surface S2 and third side surface S3 of case 2) connecting the pair of wall parts as illustrated in FIG. 2.

As illustrated in FIG. 1, in the present embodiment, lock member attachment part 22 is configured to be located between fitting part 26*a* and second fitting part 26*b* in first direction D1. That is, protrusion 33*a* of moving member 3 fits in fitting part 26*a* on a side of the pushing direction of first direction D1 with respect to a position at which lock member 4 engages with moving member 3. Protrusion 33*a* of moving member 3 fits in fitting part 26*a* and is movable in first direction D1 while movement of protrusion 33*a* of moving member 3 in second direction D2 is regulated. Further, second protrusion 33*b* of moving member 3 fits in second fitting part 26*b* on a side of the separation direction of first direction D1 with respect to the position at which lock member 4 engages with moving member 3. In this case, protrusion 33*a* and second protrusion 33*b* of moving member 3 fit in fitting part 26*a* and second fitting part 26*b*, respectively, at two positions on both sides in first direction D1 with respect to the position at which moving member 3 engages with lock member 4. In this case, when a force is applied from lock member 4 to moving member 3 in second direction D2, moving member 3 is restrained from rotating around the axis extending in third direction D3. Accordingly, when lock member 4 is moved toward moving member 3 in second direction D2 and is caused to engage with moving member 3, it is possible to cause lock member 4 to engage with moving member 3 in a state in which moving member 3 is stable. Accordingly, it is possible to cause lock member 4 to engage with moving member 3 smoothly.

Note that, although protrusion 33*a* is provided in moving member 3 and fitting part 26*a* is provided in case 2 in the present embodiment, a protrusion may be provided in case 2 and a fitting part may be provided in moving member 3. Further, although second protrusion 33*b* is provided in moving member 3 and second fitting part 26*b* is provided in case 2 in the present embodiment, a second protrusion may be provided in case 2 and a second fitting part may be provided in moving member 3.

Moving member 3 relatively moves with respect to case 2 in first direction D1. Note that, in the present specification, the "relative movement" of moving member 3 with respect to case 2 in first direction D1 encompasses movement of moving member 3 with respect to case 2 in first direction D1, movement of case 2 with respect to moving member 3 in first direction D1, and movements of both moving member 3 and case 2 in first direction D1. Moving member 3 is relatively moved with respective to case 2 when the positional relationship between moving member 3 and case 2 in first direction D1 is changed. After moving member 3 relatively moves with respect to case 2, the movement of moving member 3 in first direction D1 is regulated by lock member 4 as described later.

Moving member 3 and case 2 are assembled such that moving member 3 separates from case 2 by moving in the separation direction of first direction D1 with respect to case 2 (see FIG. 2). Further, when moving member 3 is assembled with case 2, moving member 3 can be assembled to case 2 by movement of moving member 3 in the pushing direction of first direction D1 with respect to case 2 from the state illustrated in FIG. 2. In the present embodiment, moving member 3 extends along first direction D1, and moves within space SP of case 2 extending along first direction D1. Although moving member 3 in the present embodiment is configured such that moving member 3 is accommodated telescopically in case 2, the assembled state between moving member 3 and case 2 is not particularly limited as long as moving member 3 is relatively movable with respect to case 2 in first direction D1.

In the present embodiment, moving member 3 includes moving member body 31 and long member attachment part 32 as illustrated in FIG. 2. Moving member body 31 extends along first direction D1. In the present embodiment, moving member body 31 includes insertion-through part 31*a* penetrating in first direction D1 such that inner cable 6, which is the long member, can be inserted through insertion-through part 31*a*. The shape and structure of moving member body 31 are not particularly limited. In the present embodiment, however, moving member body 31 includes first side surface S21, second side surface S22, third side surface S23, and fourth side surface S24. First side surface S21 faces the inner surface of first side surface S1 of case 2. Second side surface S22 faces the inner surface of second side surface S2 of case 2. Third side surface S23 faces the inner surface of third side surface S3 of case 2. Fourth side surface S24 faces the inner surface of fourth side surface S4 of case 2. In the present embodiment, first side surface S21 of moving member body 31 has a flat surface, second and third side surfaces S22 and S23 are each provided with second engaging part 35 to be described later, and fourth side surface S24 is formed as a curved surface which is curved in a cross section perpendicular to first direction D1.

Long member attachment part 32 of moving member 3 is provided in an end part of moving member 3 on a side of the separation direction of first direction D1. In the present embodiment, one end 52a of second outer casing 52 is attached to long member attachment part 32.

In the present embodiment, moving member 3 includes protrusion 33a as described above. As illustrated in FIG. 1, protrusion 33a fits in fitting part 26a of case 2 and is guided along first direction D1. Thus, the movement of moving member 3 in first direction D1 is stabilized. Although the protruding direction of protrusion 33a is not particularly limited, protrusion 33a protrudes from moving member 3 in third direction D3 in the present embodiment (see FIG. 2). More specifically, in an end part of moving member body 31 on a side of the pushing direction of first direction D1, protrusions 33a protrude from second and third side surfaces S22 and S23 in third direction D3. Note that, although protrusion 33a is formed in a substantially rectangular shape in the present embodiment, the shape of protrusion 33a is not particularly limited as long as protrusion 33a is capable of fitting in fitting part 26a. Further, although one protrusion 33a is provided on second side surface S22 and one protrusion 33a is provided on third side surface S23 in the present embodiment, the number of protrusion 33a is not particularly limited.

In the present embodiment, moving member 3 includes second protrusion 33b on a side of the separation direction of first direction D1 with respect to protrusion 33a as described above. As illustrated in FIG. 1, second protrusion 33b fits in second fitting part 26b of case 2, and is guided along first direction D1. Thus, the movement of moving member 3 in first direction D1 is further stabilized. Although the protruding direction of second protrusion 33b is not particularly limited, second protrusion 33b protrudes from moving member 3 in third direction D3 in the present embodiment (see FIG. 2). More specifically, in an end part of moving member body 31 on a side of the separation direction of first direction D1, second protrusions 33b protrude from second and third side surfaces S22 and S23 in third direction D3. Note that, although second protrusion 33b is formed in a substantially rectangular shape in the present embodiment, the shape of second protrusion 33b is not particularly limited as long as second protrusion 33b is capable of fitting in second fitting part 26b. Further, although one second protrusion 33b is provided on second side surface S22 and one second protrusion 33b is provided on third side surface S23 in the present embodiment, the number of second protrusion 33b is not particularly limited.

As illustrated in FIGS. 1 to 3 and 7, moving member 3 includes first engaging part 34 and second engaging part 35. First engaging part 34 engages with lock member 4 in first direction D1. Second engaging part 35 engages with lock member 4 in first direction D1 by movement of lock member 4 in second direction D2.

First engaging part 34 engages with first engaged part 44 of lock member 4 to be described later in first direction D1 (see FIGS. 1 and 3). First engaging part 34 engages with first engaged part 44 of lock member 4 in first direction D1, thereby restraining moving member 3 from coming off from case 2 as described later. Note that, in the present embodiment, first engaging part 34 is formed in protrusion 33a. First engaging part 34, however, may be provided separately from protrusion 33a. Details of first engaging part 34 will be described later.

When lock member 4 is located at a lock position to be described later, second engaging part 35 engages with second engaged part 45 of lock member 4 (see FIG. 7). When lock member 4 is located at the lock position, second engaging part 35 engages with second engaged part 45 of lock member 4 in first direction D1 to regulate movement of moving member 3 in first direction D1 with respect to case 2. The shape and structure of second engaging part 35 are not particularly limited as long as second engaging part 35 engages with second engaged part 45 of lock member 4 and is capable of regulating the movement of moving member 3 in first direction D1 with respect to case 2. In the present embodiment, second engaging part 35 can be configured as a row of teeth in which crest parts and valley parts are alternately formed along first direction D1 as illustrated in FIG. 2, for example. In the present embodiment, second engaging part 35 is disposed between protrusion 33a and second protrusion 33b in first direction D1. Thus, as described above, when lock member 4 is moved toward moving member 3 in second direction D2 and is caused to engage with moving member 3, it is possible to cause lock member 4 to engage with moving member 3 in a state in which moving member 3 is stable. Accordingly, it is possible to cause lock member 4 to engage with moving member 3 smoothly.

Figure 6:
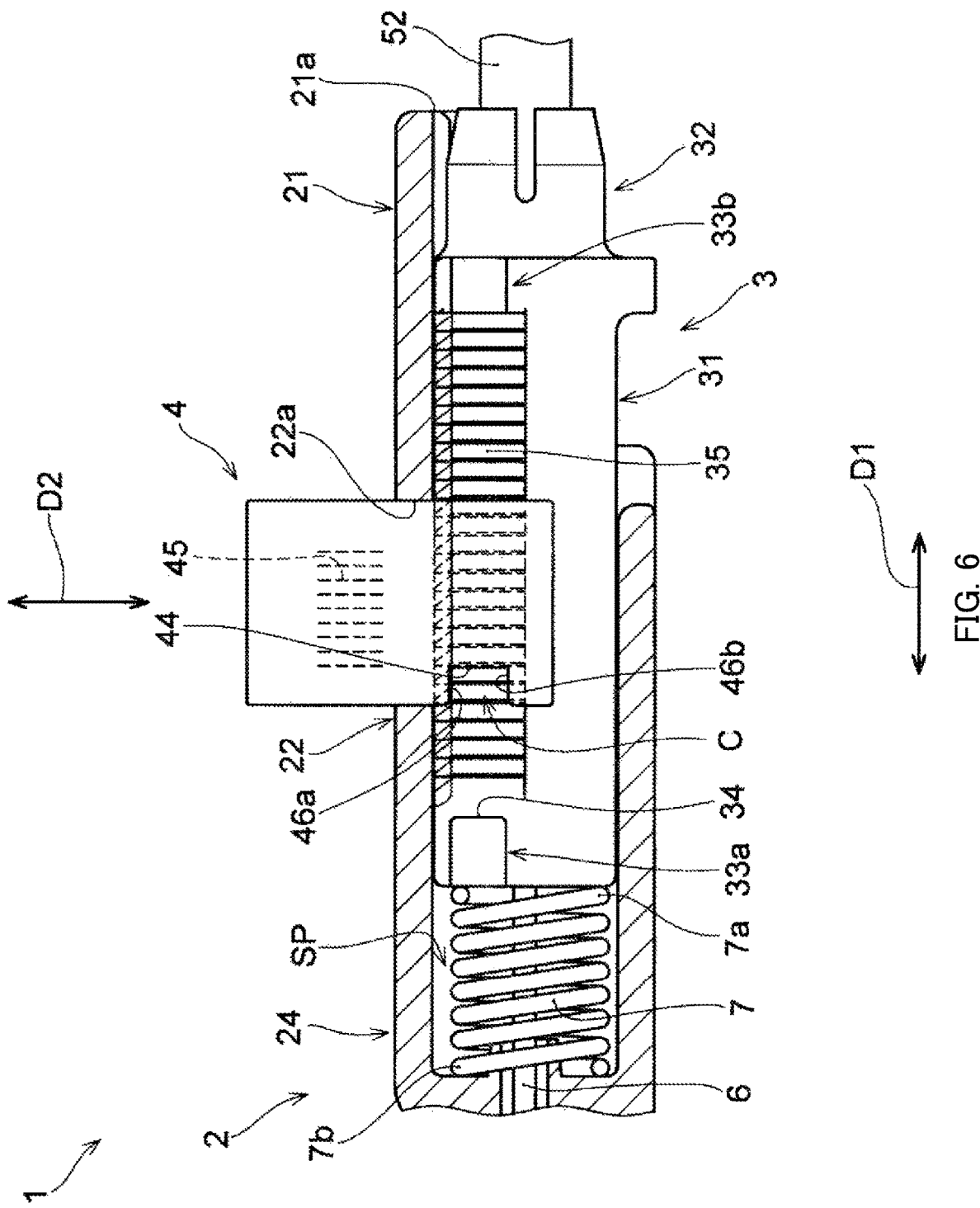
FIG. 6 illustrates a state in which a moving member is moved in a pushing direction of a first direction from the state illustrated in FIG. 3.

Lock member 4 is a member that is attached to case 2 so as to be movable in second direction D2 with respect to case 2. As illustrated in FIGS. 6 and 7, lock member 4 engages with moving member 3 by moving to the lock position to be described later in second direction D2 to regulate the movement of moving member 3 in first direction D1 with respect to case 2. Further, as illustrated in FIGS. 3 and 6, lock member 4 allows the movement of moving member 3 in first direction D1 with respect to case 2 by being located at a separate position to be described later in second direction D2. Further, lock member 4 fits in lock member attachment part 22. Even when a force in a direction separating from case 2 is applied to moving member 3 whose first engaging part 34 engages with lock member 4, movement of lock member 4 accompanying the movement of moving member 3 is restrained since case 2 is provided with the support part that abuts on and supports lock member 4 in first direction D1.

As illustrated in FIG. 2, lock member 4 includes first engaged part 44 and second engaged part 45. First engaged part 44 engages with first engaging part 34 in first direction D1. Second engaged part 45 engages with second engaging part 35 in first direction D1 by the movement of lock member 4 in second direction D2. Lock member 4 is provided in case 2 so as to be movable between the lock position (see FIGS. 5 and 7) and the separate position (see FIGS. 1, 3, 4 and 6) in second direction D2.

Figure 7:
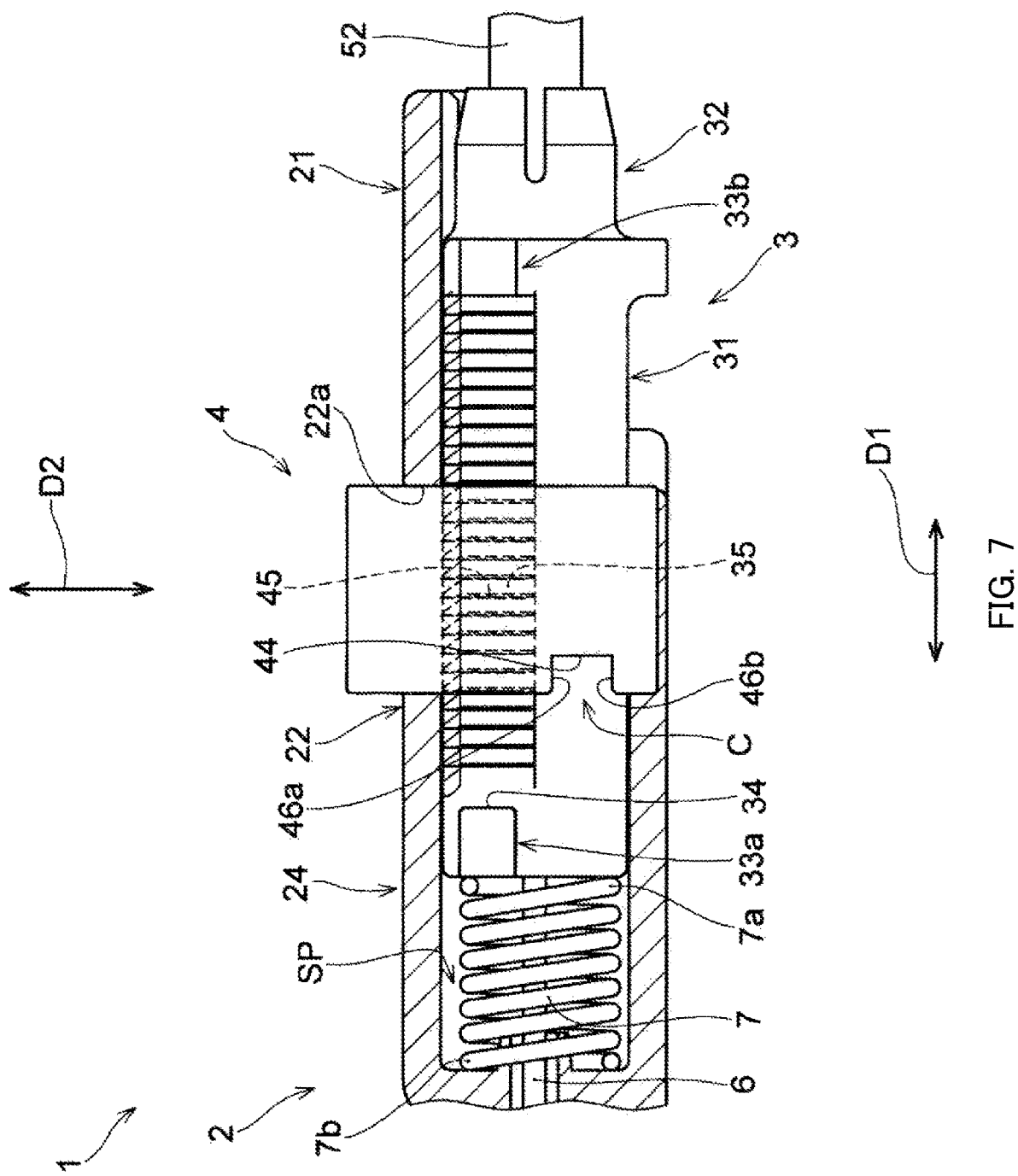
FIG. 7 illustrates a state in which the moving member is locked by moving the lock member in a pressing direction of a second direction from the state illustrated in FIG. 6.

As illustrated in FIG. 7, the lock position of lock member 4 is a position of lock member 4 in second direction D2, at which second engaged part 45 of lock member 4 is capable of engaging with second engaging part 35 of moving member 3 to regulate the movement of moving member 3 in first direction D1 with respect to case 2. Lock member 4 relatively moves with respect to moving member 3 such that the position of second engaged part 45 coincides with the position of second engaging part 35 in third direction D3 at the time of position adjustment.

As illustrated in FIGS. 3 and 6, the separate position of lock member 4 is a position in second direction D2, at which second engaged part 45 of lock member 4 separates from second engaging part 35 of moving member 3 in second direction D2 to allow relative movement of moving member 3 with respect to case 2 in first direction D1. Second engaged part 45 separates from second engaging part 35 at this separate position in second direction D2 so that second engaging part 35 and second engaged part 45 are in a non-engaged state and moving member 3 is relatively movable with respect to case 2 in first direction D1. The separate position of lock member 4 is a position at which the engagement of second engaged part 45 with second engaging part 35 does not occur, and at which first engaged part 44 can engage with first engaging part 34.

The shape and structure of lock member 4 are not particularly limited as long as lock member 4 includes first engaged part 44 and second engaged part 45 and is movable between the lock position and the separate position. In the present embodiment, as illustrated in FIGS. 2, 4 and 5, lock member 4 is configured to have a substantially U-shaped cross section perpendicular to first direction D1. Lock member 4 includes a pair of arm parts 41 and 42 and connection part 43. The pair of arm parts 41 and 42 is inserted through a pair of second openings 22a of case 2. Connection part 43 connects the pair of arm parts 41 and 42. The pair of arm parts 41 and 42 facing each other in third direction D3 is attached to case 2 so as to be astride moving member 3 (see FIG. 4). When lock member 4 is at the separate position, moving member 3 is configured to be movable in first direction D1 in a state of being interposed between the pair of arm parts 41 and 42.

As illustrated in FIGS. 2, 4 and 5, arm parts 41 and 42 each include locking step part ST on an outer surface in third direction D3. Leading end 25a of locking claw 25 of case 2 is locked with locking step part ST. In the present embodiment, as illustrated in FIG. 4, leading end 25a of locking claw 25 is locked with locking step part ST at the separate position of lock member 4, and lock member 4 is temporarily held at the separate position. Further, lock member 4 is restrained from being extracted from the separate position of lock member 4 in second direction D2 by the temporary holding. In second direction D2 with respect to locking step part ST, arm parts 41 and 42 each include second locking step part ST2 on a side of a direction in which lock member 4 is extracted (hereinafter, referred to as "extraction direction"). As illustrated in FIG. 5, when lock member 4 moves to the lock position, leading end 25a of locking claw 25 is locked with second locking step part ST2. Thus, lock member 4 is held at the lock position.

As described above, first engaged part 44 engages with first engaging part 34 of moving member 3 in first direction D1. As illustrated in FIGS. 1 and 3, first engaged part 44 is configured to engage with first engaging part 34 in first direction D1 when lock member 4 is located at the separate position. In the present embodiment, first engaged part 44 is provided in an end part of lock member 4 on a side of the pushing direction of first direction D1. The shape and structure of first engaged part 44 are not particularly limited as long as first engaged part 44 is capable of engaging with first engaging part 34 of moving member 3 in first direction D1. In the present embodiment, as illustrated in FIGS. 2 and 3, recess C having a depth toward a side of the separation direction of first direction D1 is formed on an end surface of lock member 4 on the side of the pushing direction of first direction D1, and first engaged part 44 is formed of a bottom part (a surface perpendicular to first direction D1) of recess C described above.

First engaging part 34 of moving member 3 engages with first engaged part 44 of lock member 4 in first direction D1. Thus, moving member 3 is restrained from moving in the separation direction of first direction D1. The shape and structure of first engaging part 34 are not particularly limited as long as first engaging part 34 is capable of engaging with first engaged part 44 when lock member 4 is located at the separate position. In the present embodiment, as illustrated in FIG. 3, first engaging part 34 of moving member 3 is provided in protrusion 33a which engages with first engaged part 44 formed by the bottom part of recess C. Specifically, first engaging part 34 is an end part of protrusion 33a on a side of the separation direction of first direction D1.

In the present embodiment, as illustrated in FIGS. 2 and 3, recess C includes first abutting part 46a and second abutting part 46b which are capable of abutting on protrusion 33a on both sides in second direction D2. In this case, as described later, lock member 4 is restrained from moving in both directions of second direction D2 in a state in which first engaging part 34 engages with first engaged part 44.

As described above, second engaged part 45 engages with second engaging part 35 of moving member 3. Second engaged part 45 is configured to engage with second engaging part 35 in first direction D1 when lock member 4 is located at the lock position. Thus, the movement of moving member 3 in first direction D1 with respect to case 2 is regulated. The shape and structure of second engaged part 45 are not particularly limited as long as second engaged part 45 is capable of engaging with second engaging part 35 to regulate the movement of moving member 3 in first direction D1 with respect to case 2. As described above, since case 2 includes the support part, which abuts on lock member 4 in first direction D1 and which supports lock member 4 in first direction D1, and the support part, which abuts on lock member 4 in second direction D2 and which supports lock member 4, as temporary holding, with respect to the pushing direction of first direction D1, moving member 3 can be restrained from separating from case 2 and lock member 4 can also be held in a state before position adjustment.

In the present embodiment, as illustrated in FIG. 7, second engaging part 35 is configured to engage with second engaged part 45 in both directions of first direction D1. In this case, it is possible to lock moving member 3 at an appropriate predetermined position of an attachment object by lock member 4. As illustrated in FIG. 2, for example, second engaged part 45 can be configured as a row of teeth, which meshes with second engaging part 35 and in which crest parts and valley parts are alternately formed along first direction D1. Specifically, second engaged part 45 can be configured as a row of teeth formed on each inner surface of arm parts 41 and 42 of lock member 4 in third direction D3.

In the present embodiment, when lock member 4 is at the separate position, lock member 4 regulates separation of moving member 3 from case 2 by engagement of first engaging part 34 with first engaged part 44 in first direction D1 as illustrated in FIGS. 1 and 3. Further, when lock member 4 is at the separate position, moving member 3 allows the relative position of moving member 3 with respect to case 2 to be adjusted by relative movement of moving member 3 with case 2 such that first engaging part 34 and first engaged part 44 of lock member 4 separate from each other as illustrated in FIGS. 3 and 6. Thus, the present embodiment makes it possible to adjust the position of moving member 3 with respect to case 2 and to prevent moving member 3 from separating from case 2 with a simple configuration. Specifically, as illustrated in FIGS. 1 and 3, it is configured such that first engaging part 34 of moving member 3 engages with first engaged part 44 of lock member 4 in first direction D1, and that the separation of moving member 3 is prevented by lock member 4. Further, in a state in which the separation of moving member 3 is prevented, it is possible to move moving member 3 on a side of the pushing direction of first direction D1 without moving lock member 4 from the separate position in second direction D2 as illustrated in FIGS. 3 and 6. Accordingly, the separation of moving member 3 from case 2 is regulated during transportation of position adjustment mechanism 1 or the like, and it is possible to easily adjust the position of moving member 3 without any complicated operation when position adjustment mechanism 1 is attached to an attachment object such as a vehicle.

Further, in the present embodiment, lock member 4 includes first abutting part 46a which faces protrusion 33a on a side of the extraction direction of second direction D2 as illustrated in FIGS. 2 and 3. Movement of lock member 4 from the separate position to the lock position in the state in which first engaging part 34 engages with first engaged part 44 is regulated by first abutting part 46a described above. Accordingly, even when an external force to press lock member 4 toward the lock position is applied during transportation of position adjustment mechanism 1 or the like, lock member 4 is restrained from moving to the lock position. Thus, when position adjustment mechanism 1 is assembled to an attachment object, work of moving lock member 4 from the lock position to the separate position in order to move moving member 3 in first direction D1 becomes unnecessary and workability improves.

Further, in the present embodiment, as illustrated in FIGS. 2 and 3, lock member 4 includes second abutting part 46b which faces protrusion 33a on a side of the pressing direction (the direction opposite to the extraction direction) of second direction D2. Movement of lock member 4 from the separate position in the extraction direction of second direction D2 in the state in which first engaging part 34 engages with first engaged part 44 is regulated by second abutting part 46b described above. Accordingly, lock member 4 is restrained from being extracted and separating from case 2 during transportation of position adjustment mechanism 1 or the like. Note that, first abutting part 46a and second abutting part 46b are formed in recess C of lock member 4 in the present embodiment, but may be provided in a portion other than recess C of lock member 4 as long as the above-described effect can be achieved.

Further, in the present embodiment, position adjustment mechanism 1 includes elastic member 7 including first end part 7a and second end part 7b as illustrated in FIG. 3. First end part 7a is connected to moving member 3. Second end part 7b is connected to case 2. Elastic member 7 is provided so as to energize moving member 3 in first direction D1. Elastic member 7 energizes moving member 3 in a direction of first direction D1, where the direction is a direction in which first engaging part 34 of moving member 3 engages with first engaged part 44 toward first engaged part 44. Thus, application of an external force to moving member 3 in an opposite direction to the energizing direction of elastic member 7 enables moving member 3 to move in the opposite direction (the pushing direction of first direction D1) and, in a state in which the external force to moving member 3 is released, first engaging part 34 and first engaged part 44 are in an engagement state with each other and the separation of moving member 3 is restrained so that position adjustment is facilitated. Further, in a case where protrusion 33a faces and is capable of engaging with first abutting part 46a and/or second abutting part 46b of lock member 4 in second direction D2, the movement of lock member 4 in second direction D2 is automatically regulated by elastic member 7 in a state in which the external force to moving member 3 in first direction D1 is not applied. Accordingly, it is possible to regulate the movement of lock member 4 in second direction D2 with a simple configuration. Further, elastic member 7 energizes moving member 3 in the separation direction of first direction D1, thereby stabilizing the position of moving member 3 with respect to case 2, and restraining abnormal noise or the like due to rattling of moving member 3 during transportation or the like.

The type of elastic member 7 is not particularly limited as long as elastic member 7 is capable of energizing moving member 3 in first direction D1. For example, a coil spring or the like which is expandable and contractible in first direction D1 can be used as elastic member 7. Specifically, in the present embodiment, first end part 7a of elastic member 7 abuts on an end surface of moving member 3 on a side of the pushing direction of first direction D1, and second end part 7b of elastic member 7 abuts on an inner wall of case 2 on a side of the pushing direction of first direction D1. Further, elastic member 7 can also be configured such that first end part 7a is accommodated in a spring accommodating part provided on an end surface of moving member 3.

Next, position adjustment mechanism 1 in the present embodiment will be described in more detail with reference to a control cable operating apparatus as an example. Note that, the following description is merely an example, and the present invention is not limited by the following description.

First, in a case where position adjustment mechanism 1 is constructed, moving member 3 to which second outer casing 52 is connected is moved from the state illustrated in FIG. 2 in the pushing direction of first direction D1 via first opening 21a of case 2 with respect to case 2 to which first outer casing 51 is connected. Elastic member 7, which is a coil spring, is accommodated in space SP of case 2. Elastic member 7 is contracted by movement of moving member 3 in first direction D1. When moving member 3 is moved in first direction D1, protrusion 33a of moving member 3 is guided by second fitting part 26b and fitting part 26a, and second protrusion 33b is guided by second fitting part 26b. Note that, at this time, lock member 4 is not attached to case 2 yet.

After moving member 3 is pushed into case 2 to a predetermined position in first direction D1, lock member 4 is inserted into second opening 22a of case 2. When lock member 4 is inserted into second opening 22a, arm parts 41 and 42 of lock member 4 move in second direction D2 while pushing locking claws 25 of case 2 outward in third direction D3. When lock member 4 moves to a predetermined position in second direction D2, leading ends 25a of locking claws 25 of case 2 are locked with locking step parts ST of arm parts 41 and 42, and lock member 4 stops at the separate position in second direction D2 (see FIG. 4). When the external force to moving member 3 in the pushing direction of first direction D1 is released in this state, moving member 3 is pressed by the energizing force of elastic member 7 in the separation direction of first direction D1. Thus, as illustrated in FIGS. 1 and 3, first engaging part 34 of moving member 3 engages with first engaged part 44 of lock member 4 so that the construction of position adjustment mechanism 1 is completed. Thus, moving member 3 may be only moved linearly in first direction D1 with respect to case 2 when position adjustment mechanism 1 is constructed. After lock member 4 is inserted into case 2, the construction of position adjustment mechanism 1 is semi-automatically completed without operating each member of position adjustment mechanism 1. Further, as illustrated in FIG. 3, protrusion 33a of moving member 3 engages with recess C of lock member 4 in three directions of the separation direction of first direction D1, the extraction direction of second direction D2, and the pressing direction of second direction D2 by disposing lock member 4 at the separate position in second direction D2. Thus, during transportation of position adjustment mechanism 1, before position adjustment mechanism 1 is assembled to an attachment object, or the like, for example, separation of moving member 3 from case 2 is restrained, and an unintentional movement of lock member 4 to the lock position and extraction of lock member 4 from case 2 are restrained.

Next, a description will be given of attachment of position adjustment mechanism 1 to an attachment object. First, as illustrated in FIG. 1, one end 6a and other end 6b of inner cable 6 inserted through first and second outer casings 51 and 52 are connected to operating section P1 and operated section P2, respectively. Further, other end 51b of first outer casing 51 and other end 52b of second outer casing 52 are attached to first attachment part M1 and second attachment part M2 of the attachment object, respectively. At this time, the length between the end parts of first outer casing 51 and second outer casing 52 in first direction D1 in a state in which case 2 and moving member 3 are assembled as illustrated in FIG. 3 is the longest, and is longer than that in a state in which moving member 3 is pushed in first direction D1 (see FIGS. 6 and 7). Accordingly, the total length between other end 51b of first outer casing 51 and other end 52b of second outer casing 52 is longer than those in the states illustrated in FIGS. 6 and 7. Accordingly, when other ends 51b and 52b of first and second outer casings 51 and 52 are attached to first attachment part M1 and second attachment part M2 of the attachment object, respectively, the lengths of first and second outer casings 51 and 52 have margins. Accordingly, other ends 51b and 52b of first and second outer casings 51 and 52 can be easily attached to first attachment part M1 and second attachment part M2.

When the attachment of other ends 51b and 52b of first and second outer casings 51 and 52 to the attachment object is completed, it is possible to adjust the position of moving member 3 with respect to case 2 and to adjust the length between the end parts of first outer casing 51 and second outer casing 52. At this time, as illustrated in FIG. 3, lock member 4 is at the separate position, and second engaging part 35 of moving member 3 does not engage with second engaged part 45 of lock member 4 in first direction D1 so that moving member 3 may be moved directly in the pushing direction of first direction D1. When moving member 3 is moved against the energizing force of elastic member 7 in the pushing direction of first direction D1 with respect to case 2, the length between the end parts of first outer casing 51 and second outer casing 52 in first direction D1 in the state in which case 2 and moving member 3 are assembled is shorter, as illustrated in FIG. 6, than the length between the end parts of first outer casing 51 and second outer casing 52 illustrated in FIG. 3. Then, as illustrated in FIG. 7, when lock member 4 is pushed in the pressing direction of second direction D2 and is moved to the lock position, second engaged part 45 of lock member 4 engages with second engaging part 35 of moving member 3 in first direction D1 to regulate the movement of moving member 3 in first direction D1. Further, as illustrated in FIG. 5, leading end 25a of locking claw 25 of case 2 engages with second locking step part ST2 of lock member 4 to restrain movement of lock member 4 from the lock position to the separate position.

Thus, the positions of one end 51a of first outer casing 51 and one end 52a of second outer casing 52 are adjusted when case 2 and moving member 3 relatively move each other in first direction D1 so that the length between the end parts of first outer casing 51 and second outer casing 52 can be adjusted, and the length of the inner cable extending from the end parts of the outer casings can also be adjusted.

REFERENCE SIGNS LIST

1 Position adjustment mechanism
2 Case
21 Moving member attachment part
21a First opening
22 Lock member attachment part
22a Second opening
23 Long member attachment part
24 Body part
25 Locking claw
25a Leading end of the locking claw
26a Fitting part
26b Second fitting part
3 Moving member
31 Moving member body
31a Insertion-through part
32 Long member attachment part
33a Protrusion
33b Second protrusion
34 First engaging part
35 Second engaging part
4 Lock member
41, 42 Arm part
43 Connection part
44 First engaged part
45 Second engaged part
46a First abutting part
46b Second abutting part
5 Long member
51 First outer casing
51a One end of the first outer casing
51b Other end of the first outer casing
52 Second outer casing
52a One end of the second outer casing
52b Other end of the second outer casing
6 Inner cable
6a One end of the inner cable
6b Other end of the inner cable
7 Elastic member
7a First end part
7b Second end part
A Long member-operating apparatus
C Recess
D1 First direction
D2 Second direction
D3 Third direction
M1 First attachment part
M2 Second attachment part P1 Operating section
P2 Operated section
S1 First side surface of the case
S2 Second side surface of the case
S3 Third side surface of the case
S4 Fourth side surface of the case
S21 First side surface of the moving member
S22 Second side surface of the moving member
S23 Third side surface of the moving member
S24 Fourth side surface of the moving member
SP Space
ST Locking step part
ST2 Second locking step part

The invention claimed is:

1. A position adjustment mechanism configured to perform long member position adjustment, comprising:
a case extending in a first direction;
a moving member movable in the first direction with respect to the case;
a lock member attached to the case so as to be movable in a second direction with respect to the case, the second direction being a direction perpendicular to the first direction; and
a long member connected to the case and/or the moving member, wherein
the moving member includes:
a first engaging part that engages with the lock member in the first direction; and
a second engaging part that engages with the lock member in the first direction by movement of the lock member in the second direction,
the lock member includes:
a first engaged part that engages with the first engaging part in the first direction; and
a second engaged part that engages with the second engaging part in the first direction by the movement of the lock member in the second direction,
the moving member and the case are assembled such that the moving member separates from the case by moving in a separation direction of the first direction with respect to the case,
the lock member is provided in the case so as to be movable between a lock position and a separate position, the lock position being a position at which the second engaged part engages with the second engaging part in the second direction to regulate movement of the moving member in the first direction with respect to the case, the separate position being a position at which the second engaged part separates from the second engaging part in the second direction to allow relative movement of the moving member with respect to the case,
when the lock member is at the separate position, the lock member regulates separation of the moving member from the case by engagement of the first engaging part with the first engaged part in the first direction,
the moving member allows a relative position of the moving member with respect to the case to be adjusted by separation of the first engaging part from the first engaged part of the lock member and the relative movement of the moving member with respect to the case,
the lock member comprises an abutting part which faces the moving member in the second direction such that movement of the lock member from the separate position to the lock position is regulated in a state in which the first engagement part and the first engaged part are engaged in the first direction,
the moving member comprises a protrusion which protrudes from the moving member such that the protrusion can engage with the abutting part in the second direction when the lock member is positioned at the separate position, and
the movement of the lock member from the separate position to the lock position is regulated by engagement of the protrusion and the abutting part of the lock member in the second direction.

2. The position adjustment mechanism configured to perform the long member position adjustment according to claim 1, comprising an elastic member that includes a first end part and a second end part, the first end part being connected to the moving member, the second end part being connected to the case, wherein
the elastic member is provided so as to energize the moving member in the first direction, and
the elastic member energizes the moving member in a direction of the first direction, the direction being a direction in which the first engaging part of the moving member engages with the first engaged part toward the first engaged part.

3. The position adjustment mechanism configured to perform the long member position adjustment according to claim 1, wherein the second engaging part is configured to engage with the second engaged part in both directions of the first direction.

4. The position adjustment mechanism configured to perform the long member position adjustment according to claim 1, wherein:
the protrusion protrudes in a third direction perpendicular to the first direction and the second direction, and the case is provided with a fitting part in which the protrusion fits so as to be movable in the first direction,
the first engaging part is provided in the protrusion, and
separation of the moving member with respect to the case is regulated by engagement of the first engaging part of the protrusion and the first engaged part of the lock member in the first direction.

5. The position adjustment mechanism configured to perform the long member position adjustment according to claim 4, wherein:
the position adjustment mechanism is provided with a second protrusion and a second fitting part, the second protrusion being on a side of the separation direction with respect to the protrusion, the second fitting part being a part in which the second protrusion fits so as to be movable in the first direction, and
the moving member and the case relatively move with respect to each other by sliding of the protrusion with the fitting part and sliding of the second protrusion with the second fitting part.

* * * * *